March 15, 1955 D. C. GRESHAM 2,704,252
PHOTOMECHANICAL PROCESSES
Filed Jan. 15, 1951 3 Sheets-Sheet 1

Inventor
Donald Charles Gresham
By
Stevens, Davis, Miller + Mosher
his attorneys Inventor
Donald Charles Gresham
by
Stevens, Davis, Miller & Mosher
his attorneys March 15, 1955 D. C. GRESHAM 2,704,252

PHOTOMECHANICAL PROCESSES

Filed Jan. 15, 1951 3 Sheets-Sheet 3

Inventor
Donald Charles Gresham
by
Stevens, Davis, Miller & Mosher
his attorneys

United States Patent Office 2,704,252

Patented Mar. 15, 1955

2,704,252

PHOTOMECHANICAL PROCESSES

Donald Charles Gresham, London, England, assignor to McCorquodale & Company Limited, London, England, a British company Application January 15, 1951, Serial No. 206,120

Claims priority, application Great Britain February 8, 1950

16 Claims. (Cl. 95—5.1)

Figure 1A:
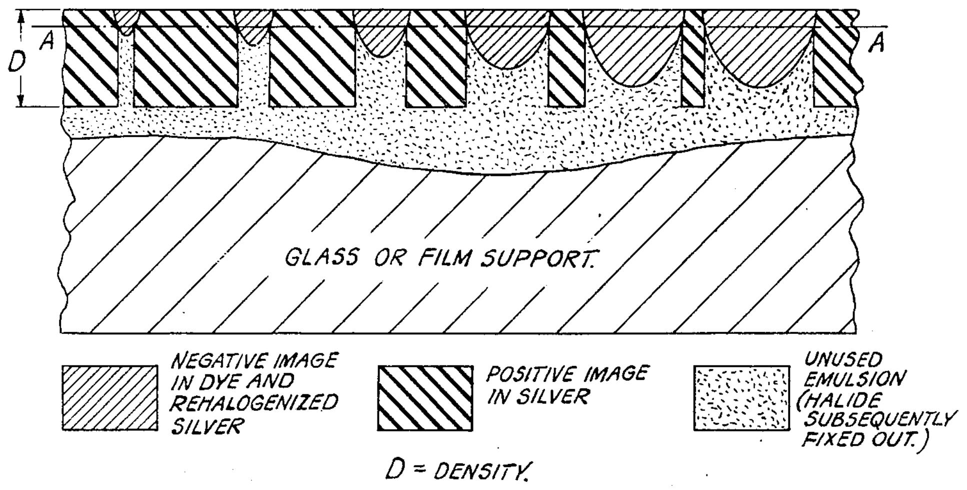

This invention relates to photomechanical processes and particularly to new methods of making screen records, for correction of tone in such records and for producing colour-corrected screen records.

In the usual photo-litho process a half-tone screen negative is first made of the original, in a process camera, a half-tone screen positive is made from this, usually by contact printing, and a printing plate is made from the screen positive. Usually a good deal of hand re-touching has to be carried out both on the screen negative and on the screen positive, to correct for deficiencies in the process, in order to produce a printed image in which the tone gradation and scale is similar to that of the original.

Attempts have been made to simplify and shorten the procedure by producing a screen positive directly from the original subject by a reversal technique. This consists essentially in exposing a photographic plate behind a half-tone screen in the process camera, to light from the original subject, developing the negative image thus obtained to a silver image, dissolving away the silver, for example in acid potassium dichromate, subjecting the plate to uniform exposure to white light (thus rendering developable the silver halide which was unaffected by the original exposure) and developing the newly formed latent image to silver. The image thus obtained is a positive image complementary to the original negative image, which was dissolved away. The process presents two major difficulties, however, in that in the first place it is necessary to give a very full exposure at the first stage in order to ensure that all the silver halide in the image areas is developed and dissolved away since only in this way can clear highlights be obtained in the positive (an essential condition where the plate is to be used for printing onto metal) and in the second place variations in the thickness of the emulsion coating on the plate result in local variations in dot size in the developed positive. The necessity of giving very full exposure at the first stage means that small dots and fine detail on the positive are liable to be lost. For these reasons the reversal technique briefly described above is not generally practised by photomechanical workers except for making positives directly from line image originals. For continuous-tone originals where a fine screen is required the method is quite unsatisfactory.

According to a first feature of the present invention there is provided a new method of producing positives directly from originals by a reversal technique, which method comprises exposing a photographic plate or film to light from an original subject, developing to silver the latent image obtained, thereby producing a negative image in silver, producing a coloured image in situ therewith and bleaching the said silver image, exposing the said plate or film to light incident on the same side thereof as the original exposure, the said light being of a colour to which the photographic emulsion is sensitive but which is absorbed by the said coloured image, redeveloping the said plate or film, fixing the plate or film to remove any residual silver halide, and removing the coloured image. More particularly according to the present invention the said method is applied to the production of screen positives, the photographic plate or film being exposed behind a half-tone screen to light from the original subject.

The coloured image may be formed by dye-toning, mordanting or the like but in the preferred form of the invention, in connection with which the invention is particularly described, the first development is effected by means of an aromatic primary amino developing agent in the presence of a colour former which couples with the oxidation products of the developer to form a dyestuff image.

By the aforesaid process a positive image in silver is directly obtained. Owing to the fact that the dyestuff negative image absorbs the re-exposure light, silver halide lying below the dyestuff dots is not re-exposed. Accordingly it is not necessary to go to the length of full first exposure as required in the standard technique referred to earlier, and commercial variations in emulsion thickness have no effect on the result obtained. Thus fine dot detail can be retained and there is virtually no local variations in dot size other than arises from the original subject.

The effect obtained by the aforesaid process is diagrammatically illustrated in the accompanying Figure 1(A) of the drawings. It will be observed that the negative image is formed in dye and silver and the latter is bleached (i. e. halogenised). The areas between the dots are exposed by the second exposure and the silver halide lying below negative dye dots is not re-exposed. It will further be observed from the drawing that the result is independent of emulsion thickness. The emulsion has been illustrated with an exaggerated variation in thickness but the dot area of the images obtained is independent of this variation. The ordinary reversal process however in which the whole of the silver halide which was unused in the first exposure is exposed in the second exposure is essentially dependent on emulsion thickness variations. The line AA on this drawing illustrates diagrammatically the effect of a uniform second exposure. It will be understood that the drawing is purely diagrammatic and that the depth of the image areas represent, not so much their physical depth but their effective density.

Generally speaking, in the photo-litho process as applied to the reproduction of original photographs it is sufficient to use photographic plates or films which are not optically sensitized, i. e. which have only their natural sensitivity to blue light. With such plates or films it is preferred that the colour former should be one which yields a yellow or yellow-orange image. If the dye image does not absorb strongly in the ultra violet waveband it may be desirable to use a U. V. filter at the re-exposure stage. The colour former may be included in the original emulsion or may be included as a constituent in the developer used for the first development step only. Generally speaking, the second development will be effected by means of a developer which does not, in the presence of a colour former, yield a dyestuff image, but where the colour former is contained in the emulsion the selection as second developer of an aromatic primary amino developing agent, which will yield with such colour former a dye image in situ with the silver image is not excluded since the positive dye image thus formed will be removed at the same time as the negative dye image so that the final product will be unchanged.

A wide range of colour formers is described in the literature and examples of colour formers suitable for the present invention may be selected from the list of yellow-orange colour formers set out in the British Journal of Photography, volume 85, p. 648.

It is, of course, important that the agent selected for use in bleaching the initially formed negative silver image should be one which does not adversely effect the residual silver halide or the dyestuff image. A suitable bleaching agent consists of an aqueous solution of potassium ferricyanide and potassium bromide.

In order that no image should be developed in the "negative area" of the plate or film during the second development stage it is important that all the silver halide rendered developable in the first exposure should be developed in the first development. This can usually be achieved by prolonging the first development step, but, as an alternative, the first development can be completed by treating the plate or film in a vigorous developer, e. g. a metol-hydroquinone type of developer. The developer used for the second development stage, producing the positive image, is preferably one giving a high contrast image and caustic soda-hydroquinone developers have been found very useful. It is advantageous to include a small quantity of an anti-fogging agent in this second developer, e. g. benzotriazole or any other of the well-known heterocyclic compounds having anti-fogging action when included in developers.

The removal of the dye image is usually effected as a final stage in the preparation of the screen positive. Generally speaking, the quinone-imine or azomethine dyes produced by colour developers, using colour formers of relatively simple structure, are soluble in common organic solvents and one convenient method of removing the dye image therefore is to bathe the plate or film in an organic solvent medium for the dyestuff. A suitable medium for many colour-formed dyestuffs is a mixture of methyl alcohol, acetone and glacial acetic acid.

Screen positives thus obtained are much superior, for the reasons already given, to those which can be obtained by the ordinary reversal process. The process is especially suitable for the reproduction of line originals giving in that connection results at least as good as the usual negative-positive process. Moreover, the result is laterally correct for litho printing by the offset process and so obviates the use of a prism on the camera. However, for many purposes the screen positive thus obtained (in common with the product obtained by making a screen negative and contact-printing a screen positive from it) is not wholly satisfactory because the tonal gradation and range of the printed product obtained from the screen positive is not sufficiently close to that of the original subject. The second exposure in the reversal process of this invention effectively prints a positive image on the portion of the emulsion which was unchanged by the first exposure and development. Accordingly the contrast of the positive image obtained depends on the second exposure. By making the negative so that by the time sufficient re-exposure has been given to yield a solid highlight dot on the positive corresponding to a small shadow hole in the negative, the light has printed through the smaller shadow dots on the negative, all the darker tones are recorded as a solid image, and in accordance with a further feature of this invention a method is provided whereby a modulated second exposure is given to such a negative in which there is least exposure in the shadows and greatest exposure in the highlights.

According to this feature of the present invention therefore a tone-corrected screen positive is obtained by modifying the re-exposure step by making that exposure at least partially to the original subject. In this way, since the highlights of the original subject reflect most light and the shadows least light the effective re-exposure of the plate is greatest in the highlights and least in the shadows which, as explained above, results in a correction of the gradation while providing the correct tonal range.

Figure 1B:
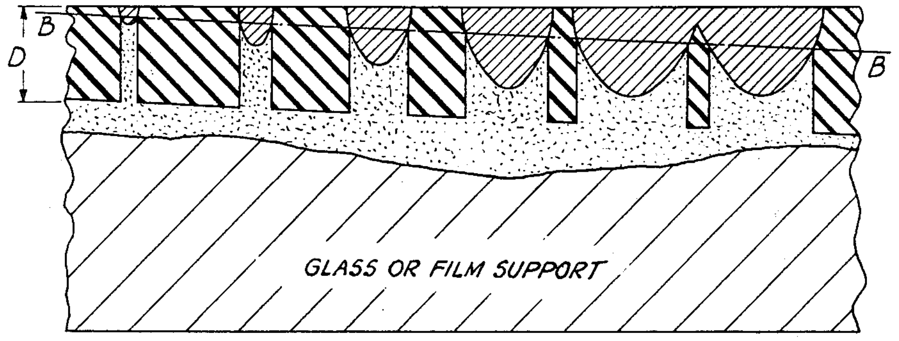

The effect obtained is diagrammatically illustrated in the accompanying Figure 1B, of the drawings. This figure is similar to Figure 1A but the line BB is shown drawn at an angle to represent the effect of a second exposure which is modulated imagewise by the original. The effect of this is greatest in the highlights and, as shown, allows the negative to be made with greater contrast of dot-sizes than could normally be tolerated and results in a tonal correction.

In practice it has been found that the relative intensities of the highlights and shadows of the original subject are usually such that, if the whole re-exposure is effected to the original subject an over-correction results. Accordingly in the preferred form of the invention, part of the re-exposure is effected to the original subject, sufficient to effect the desired tonal correction, and the remainder of the re-exposure is effected to uniform light. The optimum ratio of these exposures depends on the photographic material and the method of plate making employed but is generally found to be of the order of 30:1.

In carrying out this form of the invention the plate or film, after first development, is replaced, either in wet or dry condition, in the process camera and registered in its original position so that the second recorded image is exactly in register with the first recorded image. An exposure sufficient to effect the desired tone-correction is then effected and thereafter the original is covered with a sheet of white reflecting material and the exposure continued until the required total re-exposure is reached. Both parts of the re-exposure are, of course, effected via an appropriate filter selected to transmit only light of wavebands absorbed by the negative dye image (which may be associated with the re-halogenized silver).

Figures 2A, 2B, 2C:
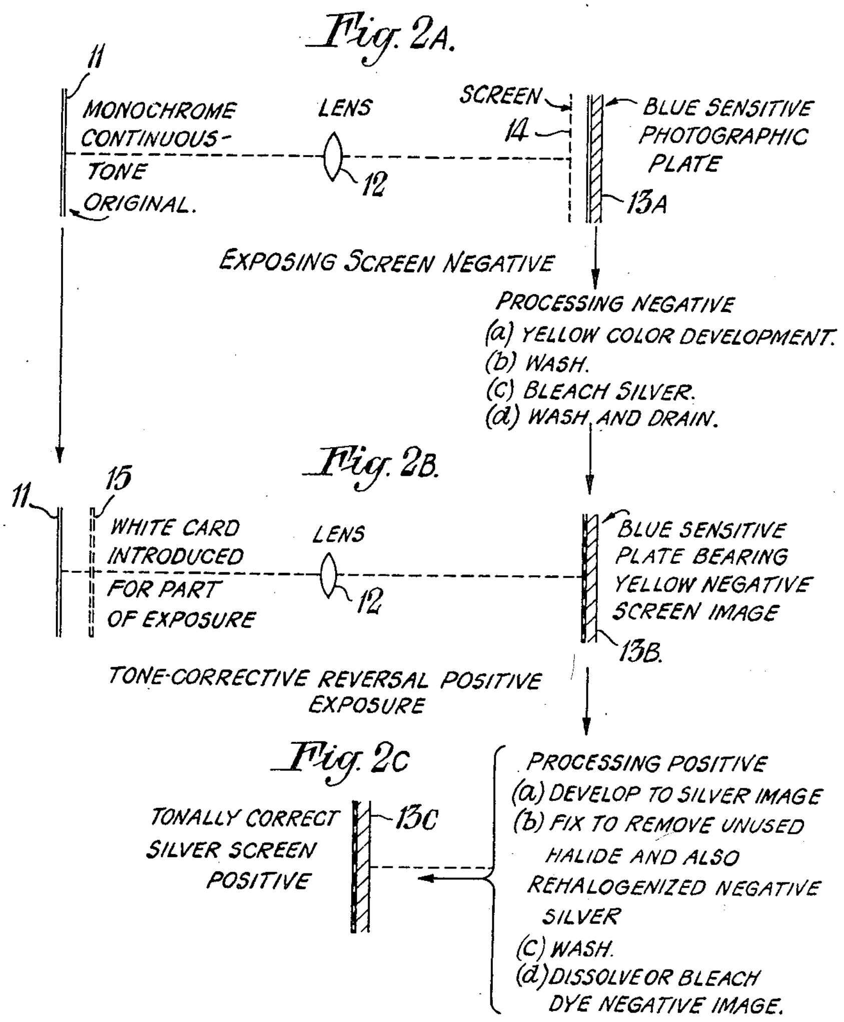

A flow sheet of this method is illustrated in Figures 2A, 2B, and 2C of the accompanying drawings. Referring to these drawings an original 11 is copied in the camera (illustrated as lens 12) on to a plate or film 13A via a screen 14. The plate or film 13A is colour developed, washed, treated to bleach the silver image, washed, drained, and (now identified as 13B) replaced in the camera in its original position. The second exposure is made partly to original 11 and partly to a white card 15. The plate or film 13B is then processed to develop a silver image, to remove residual silver halide and bleach negative silver, washed and treated to remove the dye image. This gives the final product 13C which carries a tonally corrected positive screen image in silver.

In accordance with a further aspect of this invention the aforesaid processes are modified to produce colour-separation screen positives of a coloured original and the colour rendering is corrected to allow for imperfections in the printing inks to be used. Considered in its simplest form the production of a coloured record by the photo-litho process required the preparation of three screen positives corresponding to the usual primary response of the original, i. e. red, green and blue. Litho plates are made from these and printed respectively in superposition in cyan, magenta and yellow inks. Usually, in order to strengthen the record obtained a black and white record, the so-called "black printer," is also included.

Unfortunately printing inks and especially the available cyan and magenta inks, do not accord with the requirements of these subtractive colours. The cyan inks, which should absorb red absolutely and transmit blue and green freely, usually have an undesirably high absorption of green light, to such an extent in fact that such inks are usually called "blue" inks in the trade. The magenta inks, which should absorb absolutely in the green and transmit freely in the red and blue usually have an undesirably high absorption of blue light, to such an extent that these inks are usually referred to as "red" inks in the trade. Accordingly it is always necessary to effect a very considerable amount of re-touching on the screen separation positives in order that a satisfactory colour reproduction should be finally obtained.

In accordance with the present invention, screen separation positives are prepared on panchromatic material by the technique hereinbefore described and imperfections in the printing inks to be used are balanced by effecting a correction of each separation image at the reversal exposure stage by printing a positive image on the hitherto unused areas of the emulsion by a reversal exposure which is varied from point to point over the area of the image in correspondence with variations in the colour response of the original in the waveband of that other of the separation records which is to be printed in an ink which absorbs undesirably in the waveband which the first separation record records.

Generally, in ordinary practice since, as explained above, the red record is to be printed in cyan ink which absorbs undesirably in the green, it is necessary to effect part of the re-exposure of the green record to the original through a red filter. In addition, since the green record is to be printed in magenta ink which absorbs undesirably in the blue, it is necessary to effect part of the re-exposure of the blue record to the original through a green filter. The blue record, on the other hand, is to be printed in yellow ink, which is usually spectrally satisfactory so that it is usually satisfactory to effect the re-exposure of the red record through a red filter.

In carrying out this aspect of the invention the usual procedure is to effect the re-exposure of the blue separation screen negative partially to the original subject via a green tri-colour filter, to effect the re-exposure of the green separation screen negative partially to the original subject via a red filter and to effect the re-exposure of the red separation screen negative partially to the original subject via a red filter. In this last case no colour correction is effected (since none is normally required) but the partial re-exposure to the original subject effects the tone-correction referred to earlier herein.

Figures 3A, 3B, 3C:
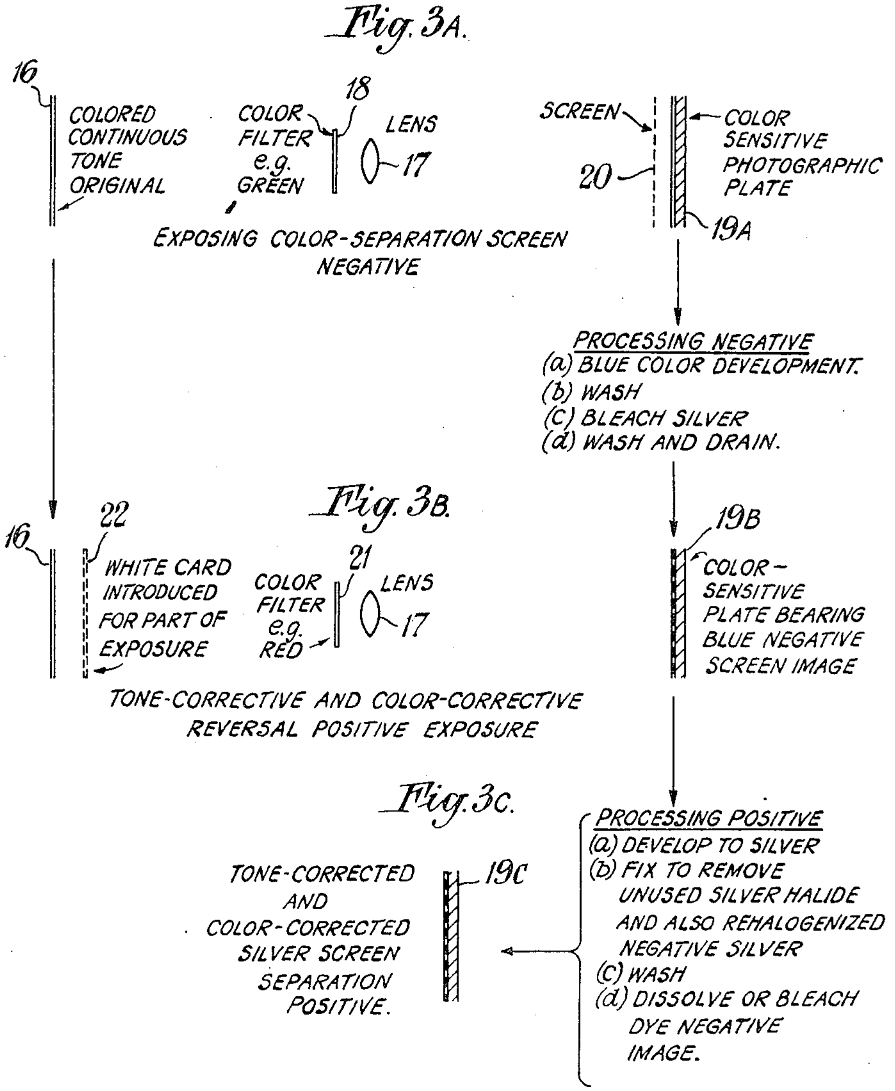

A flow sheet of this method of colour correction is illustrated in Figures 3A, 3B and 3C of the accompanying drawings. Referring to these drawings an original 16 is copied in the camera (illustrated as lens 17 via a filter 18 on to a plate or film 19A via a screen 20. The plate or film 19A is colour developed, washed, treated to bleach the silver image, washed, drained and (now identified as 19B) replaced in the camera in its original position. The second exposure is made partly to original 16 via an appropriate filter 21, selected on the basis indicated above, and partly to a white card 22. The plate or film 19B is then processed to develop a silver image, the residual silver halide and bleached negative silver is removed and the plate or film is washed and the dye image removed. This gives the final product 19C which carries a positive screen image in silver which is a tonally corrected and colour-corrected colour separation record of the original.

It is, of course, necessary in carrying out this process that the colour formed images in the negatives should, together with any silver salt present, be absorbent of the light to be used for the re-exposures. It is possible to select different colour formers for the different separation records but in practice it is convenient to use a single colour former which is an effective barrier to all the re-exposing lights. Such a colour former may advantageously yield a blue dye since none of the re-exposure steps are effected with blue light.

Suitable blue colour formers for use in this invention are for example thymol and $\alpha$-naphthol.

It is found that in some cases the highlight contrast of colour reproductions obtained by the method of this invention is insufficiently great and for optimum results it may be necessary to correct for this. One method which has been found satisfactory is to prepare a supplementary highlight mask by recording on a separate plate or film, by a very short exposure, a record only of the highlights of the original subject. The plate or film is developed in a high-contrast developer, e. g., caustic soda-hydroquinone, and used by registering it immediately in front of the screen negative at the stage where that receives its reversal exposure. The densities of the mask then effectively reduce the exposure given to the highlight areas during the reversal exposure without affecting the other areas, thus enhancing the highlight contrast.

It is sometimes found that the colour sensitivity of the developed and bleached screen negatives is rather low, so that undesirably long reversal exposures have to be given. This difficulty can to some extent be overcome by appropriate choice of sensitizers in the original panchromatic plate or film, but, as an alternative, a screen negative of which the colour sensitivity of the residual silver halide is too low may be bathed before re-exposure in a solution of an appropriate colour sensitizing dye. Well-known methods of hypersensitizing may also be employed Photographic plates and films are normally provided with an antihalation layer on the side opposite to the emulsion side but this is usually removed by developer so that it is absent after the first negative screen images are obtained. It is found that the presence of an antihalation layer is highly desirable at the reversal exposure stage if the best results are to be obtained. Accordingly, the screen negative may be coated with a new antihalation layer before it is given its reversal exposure or it may be backed by an adhesive black sheet during the reversal exposure. In a further alternative it may be arranged that the antihalation dye originally coated on the plate or film is one which is resistant to development but is removed by an acid salt or by the same treatment as is used to remove the negative dye image. Thus the antihalation dye may be in pre-formed quinone-imine or azomethine dye.

The black printing positive can be made by any of the well-known procedures but it is preferred to adopt one of the following methods. In the first method a continuous tone negative of the original is first made in the screen holder of the process camera. A screen positive is then made by the process of this invention except that to effect the re-exposure the screen negative is replaced in the camera with the continuous tone negative in the screen holder in front of it. Re-exposure is then effected to uniform light. In this way the darkest tones of the original are given most exposure and vice versa. The continuous tone negative may be processed to a silver image but preferably it is processed to a colour-formed dye image as this is found to give rise to less light scatter.

A second method consists in the following: a screen negative is made through one of the tri-colour filters at a larger lens aperture than usual and giving what would normally be a substantial overexposure. The screen is then moved away from the plate (or film) and a second exposure given through a second tricolour filter. This second exposure is sufficient to build up a continuous-tone image which (after development) has substantial density in the area corresponding to the highlights of the original and also in the area of the same colour as the filter but is insufficient to have any effect in the areas corresponding to the shadow densities of the original. The plate or film is then colour-developed, the silver is bleached and it is then given a uniform re-exposure and re-developed. The resulting positive records only the darker parts of the original because the second part of the negative exposure (without the screen) effectively obliterates the lighter tones. It has high contrast because of the large aperture used and it does not record either of the colours corresponding to the filters used for the negative exposure. The remaining colour is recorded and needs to be eliminated at the re-touching stage but since only one colour record has to be removed the re-touching is much simplified. Preferably when using this method the filters selected will be those corresponding to the two more pronounced colours in the original so that re-touching to remove the record of the third image is reduced to a minimum.

The following examples will serve to illustrate the invention. The conditions of first development in the color developer given in Examples 1 and 2 will yield a gamma value of about 3.0 on an average batch of the sensitive material specified but on any batch of the material the gamma value will be at least approximately 2.5 as will be appreciated by those skilled in the art The conditions of second development given in each example will yield a gamma value of about 5.0 on an average batch of the sensitive material specified but on any batch of the material the gamma value will be at least approximately 4.0. In all the examples a process lens of 18-inch focal length was used and the illumination consisted of four 30-amp. open-arc lamps at 3½ feet from the centre of the copyboard. In all cases the lens aperture values are given as a fraction of the extension $v$ of the camera, and the distance of the screen from the plate is 40 times the length of the side of a single screen aperture. Moreover, though in these examples photographic plates are used, flat photographic film is also capable of similar use.

EXAMPLE 1

Reproduction of a Line Original

A page of type printed in black ink on white paper was set up on the process camera as an original. The scale of reproduction was ×0.7, requiring a camera extension of 740 mm.

1. A Kodak B5 "Process Slow" plate was placed in the camera with no screen and an exposure of 22 seconds was given to the original through a tricolour blue filter (Wratten 49) at a lens aperture of $v/64$.

2. The plate was developed for 7½ minutes at 65° F. in a yellow-forming colour developer constituted of equal parts of the following solutions A and B.

A

| | | |
|---|---|---|
| N.N-diethyl-p-phenylene diamine, sulphur dioxide reaction product | g | 4.5 |
| Sodium sulphite (anhydrous) | g | 18.5 |
| Potassium bromide | g | 4 |
| Water to make 2250 cc. | | |

B

| | | |
|---|---|---|
| Acetone | cc | 200 |
| 2:5-dichloracetoacetanilide | g | 20 |
| Sodium hydroxide | g | 14 |
| Sodium carbonate (anhydrous) | g | 132 |
| Water to make 2250 cc. | | |

3. The plate was washed for 2 minutes.

4. The plate was bleached for 5 minutes in a solution of 50 g. potassium ferricyanide and 50 g. potassium bromide in a litre of water.

5. The plate was washed for 10 minutes.

6. The plate was placed face upwards in a black dish filled with water to a depth of ½ inch, under an exposing lamp. The lamp was a 15 watt opal bulb in a metal lamp house having a circular aperture 2½ inches in diameter and it was 2′6″ above the dish.

7. The exposing lamp was switched on for 65 seconds.

8. The plate was then developed for 4 minutes at 65° F. in a developer made up of equal parts of the following solutions A, B and C.

A

| | | |
|---|---|---|
| Hydroquinone | g | 38 |
| Potassium metabisulphite | g | 38 |
| Potassium bromide | g | 19 |
| Water to make 2 litres. | | |

B

| | | |
|---|---|---|
| Potassium hydroxide | g | 75 |
| Water to make 2 litres. | | |

C

| | | |
|---|---|---|
| 1% solution of benzotriazol | cc | 45 |
| Water to make 2 litres. | | |

9. The plate was fixed in an acid hardening fixing bath.

10. The plate was washed, bathed in a mixture of 900 cc. industrial spirit and 100 cc. glacial acetic acid to dissolve away the colour-formed dye image, and dried.

The resulting line positive was printed down on metal and gave excellent reproduction of the original when printed by the photo-litho offset process.

EXAMPLE 2

Reproduction of a Continuous-Tone Monochrome Original

A glossy photograph was set up on the process camera as an original. The scale of reproduction was ×0.7, requiring a camera extension of 740 mm. The reflection density range of the original was 0–1.75.

A. In the first place a highlight mask was made as follows:

1. A Kodak B5 "Process Slow" plate was placed in the screen holder of the camera and exposed to the original for 26 seconds with a neutral density filter (density 2.0) over the lens and a lens aperture of $v/32$.

2. This plate was developed for 3 minutes at 65° F. in caustic soda-hydroquinone developer.

3. The plate was bathed for 1 minute in 2% acetic acid.

4. The plate was fixed in an acid hardening fixing bath.

5. The plate was washed and dried.

B. Secondly a screen positive was made as follows:

1. A Kodak B5 "Process Slow" plate was placed in the camera behind a screen and the exposure was effected through a tricolour blue filter (Wratten 49). The word "Wratten" is a registered trade-mark. The exposure was made up 46 seconds to the original subject at a lens aperture of $v/32$ and 8 seconds to a uniform white surface at $v/64$.

2. The plate was then developed for 7½ minutes at 65° F. in a yellow-forming colour developer made up as in step 2 of Example 1.

3. The plate was washed for 2 minutes.

4. The plate was bleached for five minutes in a solution of 50 g. potassium ferricyanide and 50 g. potassium bromide in a litre of water.

5. The plate was washed for 10 minutes.

6. The plate was rinsed in water to which a little wetting agent was added.

7. The plate was allowed to drain for 10 minutes.

8. The plate was replaced in the camera, in the position it occupied for the first exposure. The screen was removed and the highlight mask was placed in the screen gear in the position it occupied when it was exposed.

9. The plate was re-exposed to the original without a filter for 2¾ minutes, the lens being at full aperture (46 mm.). The original was then covered with white paper and a further exposure of 18 seconds was made at a lens aperture of 27 mm.

10. The plate was then developed for 4 minutes at 65° F. in a developer made up as in step 8 of Example 1.

11. The plate was fixed in an acid hardening fixing bath.

12. The plate was washed, bathed in a mixture of 900 cc. industrial spirit and 100 cc. glacial acetic acid to dissolve away the colour-formed dye image, and dried.

The resulting screen positive was printed down on to metal and gave an excellent reproduction of the original photograph, the density range and gradation of the reproduction when coated with a layer of clear varnish approximating very closely to that of the original.

EXAMPLE 3

Reproduction of a Coloured Original

A colour photographic print was set up on the process camera as an original. The scale of reproduction was ×0.7 requiring a camera extension of 740 mm. The reflection density range of the original was 0.1 to 1.95.

A. *Preparation of the highlight mask*

1. A Kodak P25 "Slow Thin-film Panchromatic" plate was placed in the screen-holder of the camera and exposed to the original for 35 seconds with a neutral density filter (density 2.0) over the lens and a lens aperture of $v/32$.

2. This plate was developed for 3 minutes at 65° F. in caustic soda-hydroquinone developer.

3. The plate was bathed for 1 minute in 2% acetic acid.

4. The plate was fixed in an acid hardening fixing bath.

5. The plate was washed and dried.

B. *Preparation of the blue separation screen positive (the "yellow-printer")*

1. A Kodak P25 "Slow Thin-film Panchromatic" plate was placed in the camera behind a screen and the exposure was effected through a tricolour blue filter (Wratten 49). The exposure was made up of 35 seconds to the original subject at a lens aperture of $v/32$ and 6 seconds to a uniform white surface at a lens aperture of $v/64$..

2. The plate was then developed for 7½ minutes at 65° F. in a blue-forming colour developer constituted of equal parts of the following solutions A and B.

A

| | | |
|---|---|---|
| N.N-diethyl-p-phenylene diamine, sulphur dioxide reaction product | g | 4.5 |
| Sodium sulphite (anhydrous) | g | 18.5 |
| Potassium bromide | g | 4 |
| Water to make 2250 cc. | | |

B

| | | |
|---|---|---|
| Acetone | cc | 200 |
| Thymol | g | 20 |
| Sodium hydroxide | g | 14 |
| Sodium carbonate (anhydrous) | g | 132 |
| Water to make 2250 cc. | | |

3. The plate was washed for 2 minutes.

4. The plate was bleached for 5 minutes in a solution of 50 g. potassium ferricyanide and 50 g. potassium bromide in a litre of water.

5. The plate was washed for 10 minutes.

6. The plate was rinsed in water to which a little wetting agent was added.

7. The plate was allowed to drain for 10 minutes.

8. The plate was replaced in the camera, in the position it occupied for the first exposure. The screen was removed and the highlight mask was placed in the screen gear in the position it occupied when it was exposed.

9. The plate was re-exposed to the original through a green filter (Wratten 56) for 8½ minutes, the lens being at full aperture (46 mm.). The original was then covered with white paper and a further exposure of 52 seconds was made at a lens aperture of 27 mm.

10. The plate was then developed for 4 minutes at 65° F. in a developer constituted as that used in step 8 of Example 1.

11. The plate was fixed in an acid hardening fixing bath.

12. The plate was washed, bathed in a mixture of 900 cc. industrial spirit and 100 cc. glacial acetic acid to dissolve away the colour-formed dye image, and dried.

C. *Preparation of the green separation screen positive (the "red printer")*

1. A Kodak P25 plate was placed in the camera behind a screen and the exposure was effected through a tricolour green filter (Wratten 61). The exposure was made up of 64 seconds to the original subject at a lens aperture of $v/32$ and 11 seconds to a uniform white surface at a lens aperture of $v/64$.

2. The plate was developed for 5½ minutes at 65° F. in the blue-forming developer used for the "yellow printer."

3 to 5. These steps were the same as for the "yellow printer."

6. The plate was bathed for 5 minutes in a 1 in 100,000 solution of pinacyanol bromide containing 7.5% of ethyl alcohol, traces of pyridine and 2% of triethanolamine.

7. The plate was suspended in a tank of still water for 5 minutes.

8. The plate was rinsed in water containing a small amount of wetting agent.

9. The plate was allowed to drain.

10. The plate was replaced in the camera with the highlight mask in place of the screen.

11. The plate was re-exposed to the original through a red filter (Wratten 23A) for 6½ minutes at a lens aperture of 46 mm. The original was then covered with white paper and a further exposure of 39 seconds was made at a lens aperture of 27 mm.

12 to 14. These steps were identical with Nos. 10–12 used for the "yellow printer."

D. *Preparation of the red separation screen positive (the "blue printer")*

1. A Kodak P25 plate was placed in the camera behind a screen and the exposure was effected through a tricolour red filter (Wratten 29). The exposure was made up of 100 seconds to the original subject at a lens aperture of $v/32$ and 17 seconds to a uniform white surface at a lens aperture of $v/64$.

2. The plate was developed for 5 minutes at 65° F. in the blue-forming developer used for the "yellow printer."

3 to 14. These steps were effected exactly as for the "red printer."

E. *Preparation of the black printer*

1. A Kodak P25 plate was placed in the camera behind a screen. The first part of the exposure was effected through a tricolour red filter (Wratten 29). This exposure was made up of 132 seconds to the original subject at $v/24$ and 17 seconds at $v/64$ to a uniform white surface. The red filter was then replaced by a tricolour blue filter (Wratten 49), the screen was removed and a further exposure of 25 seconds was given to the original at a lens aperture of $v/64$.

2. This step was the same as for the "red printer."

3 to 8. These steps were the same as for the "yellow printer."

9. The plate was re-exposed to a uniform white surface through a green filter (Wratten 56) for 80 seconds at lens aperture of 27 mm.

10 to 12. These steps were the same as for the "yellow printer."

The positive screen records thus obtained were printed down on metal and a colour reproduction obtained in the usual way. It compared very closely with the original subject and the closeness of the reproduction was found to be still further improved by a small amount of re-touching on the black printer. None of the colour separation printers required re-touching.

The method described herein is not wholly suitable for reproduction for miniature colour transparencies owing to the necessity of using very long exposure times which may damage the transparency. Accordingly it is preferred in accordance with this invention to make, initially, continuous tone separation positives from the transparency and to work from these. This method requires a slight modification of technique. Thus the "red printer" positive may be made by making a first exposure to the green separation positive and a reversal exposure to the red separation positive. Similarly, the "yellow printer" positive may be made by a first exposure to the blue separation positive and a reversal exposure to the green separation positive. Since the "blue printer" positive does not normally require correction, both exposures can in this case be made to the red separation positive.

Though this invention has been described with particular reference to the photo-litho process for which it is especially suitable, it will be appreciated that the invention may also be applied, with minor modifications, in bi-metal litho, half-tone block and intaglio half-tone photo-gravure processes.

It will be noted that in each of the foregoing examples the photographic materials specified have an emulsion with "high contrast" and when this expression is used in the appended claims it has reference to one of the many commercially available materials made primarily for the production of line or screen records. At the present time these fall into classes which I define as follows: (*a*) Materials which, when exposed to white light and developed for 3 minutes at 68° F. in Kodak developer D11, yield a gamma value of at least 3.5; (*b*) materials of the "Kodalith" type which have silver chloride emulsions and when developed in special developers containing formaldehyde or reaction products of formaldehyde yield a gamma value of at least 4.0.

Where I refer to a gamma value of a dye image I refer to a figure derived by developing a step wedge on the material to be used in the color developer to be used, fixing out the undeveloped silver halide in a fixing bath which does not appreciably affect the dye image, bleaching the silver image in the bleaching bath to be used, measuring the densities of the wedge steps through a filter of complementary color to the dye image, plotting these densities against the logarithms of the exposures which produced them and deriving the gradient value from the curve in the usual way.

I claim:

1. A method of producing screen positives directly from originals by a reversal technique, which method comprises exposing a photographic element having an emulsion of high contrast behind a half-tone screen to light from an original subject, developing the screen latent image obtained with an aromatic primary amino developing agent in the presence of a color coupler which combines with the oxidation products of such developer to produce a dye image, thereby producing a negative screen image made up of areas of developed silver with a dye image in situ therewith, said development being such as to produce a dye image with a gamma value of at least approximately 2.5, bleaching the said silver image, exposing the unexposed areas of the said photographic element to light incident on the same side thereof as the original exposure, the said light being of a color to which the photographic emulsion is sensitive and being of such intensity that the light is substantially completely absorbed by the said dye image at its maximum density, redeveloping the said photographic element to a gamma of at least approximately 4.0 in a developer which will not redevelop any re-halogenized silver negative image which may be present, fixing the photographic element to remove the silver halide remaining below the negative image which has been optically screened from the second exposure and to remove any silver halide remaining below the positive image and any re-halogenized silver of the negative image, and then removing the negative dye image.

2. A method of producing screen positive directly from originals by a reversal technique, which method comprises exposing a photographic element having an emulsion of high contrast behind a half-tone screen to light from an original subject, developing the screen latent image obtained with an aromatic primary amino developing agent in the presence of a color coupler which combines with the oxidation products of such developer to produce a dye image, thereby producing a negative screen image made up of areas of developed silver with a dye image in situ therewith, said development being such as to produce a dye image with a gamma value of at least approximately 2.5, bleaching the said silver image, exposing the unexposed areas of the said photographic element to light incident on the same side thereof as the original exposure, the said light being of a color to which the photographic emulsion is sensitive and being of such intensity that the light is substantially completely absorbed by the said dye image at its maximum density, at least part of such exposure being to the original subject, redeveloping the said photographic element to a gamma of at least approximately 4.0 in a developer which will not redevelop any rehalogenized silver negative image which may be present, fixing the photographic element to remove any residual silver halide, and removing the dye image.

3. Process for the production of a set of screen positive records, recording different color sensations of an original multicolored subject, and suitable for the preparation of litho plates for reproduction of the original in different colored inks at least one of which inks absorbs undesirably in a waveband which it should freely transmit, which comprises producing the separate screen positive records each by exposing a photographic element having an emulsion of high contrast behind a half-tone screen to light from the original subject, developing the screen latent image obtained with an aromatic primary amino developing agent in the presence of a color coupler which combines with the oxidation products of such developer to produce a dye image, thereby producing a negative image made up of areas of developed silver with a dye image in situ therewith, said development being such as to produce a dye image with a gamma value of at least approximately 2.5, bleaching the said silver image, exposing the unexposed areas of the said photographic element to light incident on the same side thereof as the original exposure, the said light being of a color to which the photographic emulsion is sensitive and being of such intensity that the light is substantially completely absorbed by the said dye image at its maximum density, redeveloping the photographic element to a gamma of at least approximately 4.0 in a developer which will not redevelop any rehalogenized silver negative image which may be present, fixing the photographic element to remove any residual silver halide and removing the dye image, the said reversal exposure being effected in each case at least partially to light from the original subject, and, in the case of the separation record which records the color response of the original in the waveband which is undesirably absorbed by the printing ink to be used with a litho plate derived from one other of the separation records, varying the said reversal exposure over the area of the image in correspondence with variations in the color response of the original in the waveband of which the other separation record records the response of the original.

4. A method of producing screen positives directly from originals by a reversal technique, which method comprises exposing a photographic element having an emulsion of high contrast and sensitive only to blue light behind a half-tone screen to light from an original subject, developing the screen latent image obtained with an aromatic primary amino developing agent in the presence of a color coupler which combines with the oxidation products of such developer to produce a yellow to orange dye image, thereby producing a negative image made up of areas of developed silver with a dye image in situ therewith, said development being such as to produce a dye image with a gamma value of at least approximately 2.5, bleaching the said silver image, exposing the unexposed areas of the said photographic element to light including blue light incident on the same side thereof as the original exposure and of such intensity that it is substantially completely absorbed by the dye image at its maximum density, redeveloping the said photographic element to a gamma of at least approximately 4.0 in a developer which will not redevelop any rehalogenized silver negative image which may be present, fixing the photographic element to remove any residual silver halide, and removing the dye image.

5. A method of producing screen positives directly from originals by a reversal technique, which method comprises exposing a photographic element having an emulsion of high contrast and sensitive only to blue light behind a half-tone screen to light from an original subject, developing the screen latent image obtained with an aromatic primary amino developing agent in the presence of a color coupler which combines with the oxidation products of such developer to produce a yellow to orange image, thereby producing a negative image made up of areas of developed silver with a dye image in situ therewith, said development being such as to produce a dye image with a gamma value of at least approximately 2.5, bleaching the said silver image, exposing the unexposed areas of the said photographic element to light including blue light incident on the same side thereof as the original exposure and of such intensity that it is substantially completely absorbed by the dye image at its maximum density, at least part of such exposure being to the original subject, redeveloping the said photographic element to a gamma of at least approximately 4.0 in a developer which will not redevelop any rehalogenized silver negative image which may be present, fixing the photographic element to remove any residual silver halide, and removing the dye image.

6. A method of producing screen positives directly from originals by a reversal technique, which method comprises exposing a photographic element having an emulsion of high contrast behind a half-tone screen to light from an original subject, developing the screen latent image obtained with an aromatic primary amino developing agent in the presence of a color coupler which combines with the oxidation products of such developer to produce a dye image, thereby producing a negative image made up of areas of developed silver with a dye image in situ therewith, said development being such as to produce a dye image with a gamma value of at least approximately 2.5, bleaching the said silver image, exposing the unexposed areas of the said photographic element to light incident on the same side thereof as the original exposure, the said light being of a color to which the photographic emulsion is sensitive and being of such intensity that the light is substantially completely absorbed by the said dye image at its maximum density, part of such exposure being to the original subject and the remainder being an overall uniform exposure, redeveloping the said photographic element to a gamma value of at least approximately 4.0 in a developer which will not redevelop any rehalogenized silver negative image which may be present, fixing the photographic element to remove any residual silver halide, and removing the dye image.

7. A method of producing screen positives directly from originals by a reversal technique, which method comprises exposing a photographic element having an emulsion of high contrast behind a half-tone screen to light from an original subject, developing the screen latent image obtained with an aromatic primary amino developing agent in the presence of a color coupler which combines with the oxidation products of such developer to produce a dye image, thereby producing a negative image made up of areas of developed silver with a dye image in situ therewith, said development being such as to produce a dye image with a gamma value of at least approximately 2.5, bleaching the said silver image, exposing the unexposed areas of the said photographic element to light incident on the same side thereof as the original exposure, the said light being of a color to which the photographic element is sensitive and being of such intensity that the light is substantially completely absorbed by the said dye image at its maximum density, part of such exposure being to the original subject and the remainder being an overall uniform exposure, the relative proportions of exposure being of the order of 30:1, redeveloping the said photographic element to a gamma of at least approximately 4.0 in a developer which will not redevelop any rehalogenized silver negative image which may be present, fixing the photographic element to remove any residual silver halide, and removing the dye image.

8. Process for the production of a set of three screen positive records, recording the blue, green and red sensations of an original multicolored subject and suitable for the preparation of litho plates for reproduction of the original respectively in yellow, magenta and cyan inks of which the cyan ink has an undesirably high absorption for green light, which comprises producing the separate screen positive records each by exposing a photographic element having an emulsion of high contrast behind a half-tone screen to light from the original subject, via blue, green and red filters respectively, the photographic element in each case being sensitive to the light transmitted by said filter, developing each screen latent image thus obtained with an aromatic primary amino developing agent in the presence of a color coupler which combines with the oxidation products of such developer to produce a dye image, thereby producing a negative image made up of areas of developed silver with a dye image in situ therewith, said development being such as to produce a dye image having a gamma value of at least approximately 2.5, bleaching the said silver image, exposing the unexposed areas of the said photographic element to light incident on the same side thereof as the original exposure, the said light being of a color to which the photographic emulsion is sensitive and being of such intensity that the light is substantially completely absorbed by the said dye image at its maximum density, redeveloping the photographic element to a gamma of at least approximately 4.0 in a developer which will not redevelop any rehalogenized silver negative image which may be present, fixing the photographic element to remove any residual silver halide and removing the dye image, the said reversal exposure being effected in each case at least partially to light from the original subject and in the case of the green separation record effecting part of the said reversal exposure to light from the original passing through a red filter.

9. Process for the production of a set of three screen positive records, recording the blue, green and red sensations of an original multicolored subject and suitable for the preparation of litho plates for reproduction of the original respectively in yellow, magenta and cyan inks of which the magenta ink has an undesirably high absorption for blue light, which comprises producing the separate screen positive records each by exposing a photographic element having an emulsion of high contrast behind a half-tone screen to light from the original subject, via blue, green and red filters respectively, the photographic element in each case being sensitive to the light transmitted by said filter, developing each screen latent image thus obtained with an aromatic primary amino developing agent in the presence of a color coupler which combines with the oxidation products of such developer to produce a dye image, thereby producing a negative image made up of areas of developed silver with a dye image in situ therewith, said development being such as to produce a dye image with a gamma value of at least approximately 2.5, bleaching the said silver image, exposing the unexposed areas of the said photographic element to light incident on the same side thereof as the original exposure, the said light being of a color to which the photographic emulsion is sensitive and being of such intensity that the light is substantially completely absorbed by the said dye image at its maximum density, redeveloping the photographic element to a gamma of at least approximately 4.0 in a developer which will not redevelop any rehalonized silver negative image which may be present, fixing the photographic element to remove any residual silver halide and removing the dye image, the said reversal exposure being effected in each case at least partially to light from the original subject and in the case of the blue separation record effecting part of the said reversal exposure to light from the original passing through a green filter.

10. Process for the production of a set of three screen positive records, recording the blue, green and red sensations of an original multicolored subject and suitable for the preparation of litho plates for reproduction of the original respectively in yellow, magenta and cyan inks of which the cyan ink has an undesirably high absorption for green light and of which the magenta ink has an undesirably high absorption for blue light, which comprises producing the separate screen positive records each by exposing a photographic element having an emulsion of high contrast behind a half-tone screen to light from the original subject, via blue, green and red filters, respectively, the photographic element in each case being sensitive to the light transmitted by said filter, developing each screen latent image thus obtained with an aromatic primary amino developing agent in the presence of a color coupler which combines with the oxidation products of such developer to produce a dye image, thereby producing a negative image made up of areas of developed silver with a dye image in situ therewith, said development being such as to produce a dye image with a gamma value of at least approximately 2.5 bleaching the said silver image, exposing the unexposed areas of the said photographic element to light incident on the same side thereof as the original exposure, the said light being of a color to which the photographic emulsion is sensitive and being of such intensity that the light is substantilaly completely absorbed by the said dye image at its maximum density, redeveloping the photographic element to a gamma of at least approximately 4.0 in a developer which will not redevelop any rehalogenized silver negative image which may be present, fixing the photographic element to remove any residual silver halide and removing the dye image, the said reversal exposure being effected in each case at least partially to light from the original subject, in the case of the green separation record effecting part of the said reversal exposure to light from the original passing through a red filter, in the case of the blue separation record effecting part of the said reversal exposure to light from the original passing through a green filter, and in the case of the red separation record effecting part of the said reversal exposure to light from the original passing through a red filter.

11. Process for the production of a set of three screen positive records, recording the blue, green and red sensations of an original multicolored subject and suitable for the preparation of litho plates for reproduction of the original respectively in yellow, magenta and cyan inks of which the cyan ink has an undesirably high absorption for green light, and of which the magenta ink has an undesirably high absorption for blue light, which comprises producing the separate screen positive records each by exposing a photographic element having an emulsion of high contrast behind a half-tone screen to light from the original subject, via blue, green and red filters respectively, the photographic element in each case being sensitive to the light transmitted by the said filter, developing each screen latent image thus obtained with an aromatic primary amino developing agent in the presence of a color coupler which combines with the oxidation products of such developer to produce a blue dye image, thereby producing a negative image made up of areas of developed silver with a blue dye image in situ therewith, said development being such as to produce a dye image with a gamma value of at least approximately 2.5, bleaching the said silver image, exposing the unexposed areas of the said photographic element to light incident on the same side thereof as the original exposure, the said light being of a color to which the photographic emulsion is sensitive and being of such intensity that the light is substantially completely absorbed by the said blue dye image at its maximum density, redeveloping the photographic element to a gamma of at least approximately 4.0 in a developer which will not redevelop any rehalogenized silver negative image which may be present, fixing the photographic element to remove any residual silver halide and removing the blue dye image, the said reversal exposure being effected in each case at least partially to light from the original subject, in the case of the green separation record effecting part of the said reversal exposure to light from the original passing through a red filter, in the case of the blue separation record effecting part of the said reversal exposure to light from the original passing through a green filter and in the case of the red separation record effecting part of the said reversal exposure to light from the original passing through a red filter.

12. Process for the production of a set of three screen positive records, recording the blue, green and red sensations of an original multicolored subject and suitable for preparation of litho plates for reproduction of the original respectively in yellow, magenta and cyan inks of which the cyan ink has an undesirably high absorption for green light, which comprises producing the separate screen positive records each by exposing a photographic element having an emulsion of high contrast behind a half-tone screen to light from the original subject, via blue, green and red filters respectively, the photographic element in each case being sensitive to the light transmitted by said filter, developing each screen latent image thus obtained with an aromatic primary amino developing agent in the presence of a color coupler which combines with the oxidation products of such developer to produce a dye image, thereby producing a negative image made up of areas of developed silver with a dye image in situ therewith, said development being such as to produce a dye image with a gamma value of at least approximately 2.5, bleaching the said silver image, exposing the unexposed areas of the said photographic element to light incident on the same side thereof as the original exposure, the said light being of a color to which the photographic emulsion is sensitive and being of such intensity that the light is substantially completely absorbed by the said dye image at its maximum density, redeveloping the photographic element to a gamma of at least approximately 4.0 in a developer which will not redevelop any rehalogenized silver negative image which may be present, fixing the photographic element to remove any residual silver halide and removing the dye image, the said reversal exposure being effected in each case at least partially to light from the original subject and in the case of the green separation record effecting part of the said reversal exposure to light from the original passing through a red filter, each said reversal exposure being effected with the photographic element behind and in register with a record of the highlights only of the original subject.

13. Process for the production of a set of three screen positive records, recording the blue, green and red sensations of an original multicolored subject and suitable for the preparation of litho plates for reproduction of the original respectively in yellow, magenta and cyan inks of which the magenta ink has an undesirably high absorption for blue light, which comprises producing the separate screen positive records each by exposing a photographic element having an emulsion of high contrast behind a half-tone screen to light from the original subject, via blue, green and red filters respectively, the photographic element in each case being sensitive to the light transmitted by said filter, developing each screen latent image thus obtained with an aromatic primary amino developing agent in the presence of a color coupler which combines with the oxidation products of such developer to produce a dye image, thereby producing a negative image made up of areas of developed silver with a dye image in situ therewith, said development being such as to produce a dye image with a gamma value of at least approximately 2.5, bleaching the said silver image, exposing the unexposed areas of the said photographic element to light incident on the same side thereof as the original exposure, the said light being of a color to which the photographic emulsion is sensitive and being of such intensity that the light is substantially completely absorbed by the said dye image at its maximum density, redeveloping the photographic element to a gamma of at least approximately 4.0 in a developer which will not redevelop any rehalogenized silver negative image which may be present, fixing the photographic element to remove any residual silver halide and removing the dye image, the said reversal exposure being effected in each case at least partially to light from the original subject and in the case of the blue separation record effecting part of the said reversal exposure to light from the original passing through a green filter, each said reversal exposure being effected with the photographic element behind and in register with a record of the highlights only of the original subject.

14. Process for the production of a set of three screen positive records, recording the blue, green and red sensations of an original multicolored subject and suitable for the preparation of litho plates for reproduction of the original respectively in yellow, magenta and cyan inks of which the cyan ink has a undesirably high absorption for green light and of which the magenta ink has an undesirably high absorption for blue light, which comprises producing the separate screen positive records each by exposing a photographic element having an emulsion of high contrast behind a half-tone screen to light from the original subject, via blue, green and red filters respectively, the photographic element in each case being sensitive to the light transmitted by said filter, developing each screen latent image thus obtained with an aromatic primary amino developing agent in the presence of a color coupler which combines with the oxidation products of such developer to produce a dye image, thereby producing a negative image made up of areas of developed silver with a dye image in situ therewith, said development being such as to produce a dye image with a gamma value of at least approximately 2.5, bleaching the said silver image, exposing the unexposed areas of the said photographic element to light incident on the same side thereof as the original exposure, the said light being of a color to which the photographic emulsion is sensitive and being of such intensity that the light is substantially completely absorbed by the said dye image at its maximum density, redeveloping the photographic element to a gamma of at least approximately 4.0 in a developer which will not redevelop any rehalogenized silver negative image which may be present, fixing the photographic element to remove any residual silver halide, and removing the dye image, the said reversal exposure being effected in each case at least partially to light from the original subject, in the case of the green separation record effecting part of the said reversal exposure to light from the original passing through a red filter, in the case of the blue separation record effecting part of the said reversal exposure to light from the original passing through a green filter, and in the case of the red separation record effecting part of the said reversal exposure to light from the original passing through a red filter, each said reversal exposure being effected with the photographic element behind and in register with a record of the highlights only of the original subject.

15. Process for the production of a set of three screen positive records, recording the blue, green and red sensations of an original multicolored subject and suitable for the preparation of litho plates for reproduction of the original respectively in yellow, magenta and cyan inks of which the cyan ink has an undesirably high absorption for green light, and of which the magenta ink has an undesirably high absorption for blue light, which comprises producting the separate screen positive records each by exposing a photographic element having an emulsion of high contrast behind a half-tone screen to light from the original subject, via blue, green and red filters respectively, the photographic element in each case being sensitive to the light transmitted by the said filter, developing each screen latent image thus obtained with an aromatic primary amino developing agent in the presence of a color coupler which combines with the oxidation products of such developer to produce a blue dye image, thereby producing a negative image made up of areas of developed silver with a blue dye image in situ therewith, said development being such as to produce a dye image with a gamma value of at least approximately 2.5, bleaching the said silver image, exposing the unexposed areas of the said photographic element to light incident on the same side thereof as the original exposure, the said light being of a color to which the photographic emulsion is sensitive and being of such intensity that the light is substantially completely absorbed by the said blue dye image at its maximum density, redevolping the photographic element to a gamma value of at least approximately 4.0 in a developer which will not redevelop any rehalogenized silver negative image which may be present, fixing the photographic element to remove any residual silver halide and removing the blue dye image, the said reversal exposure being effected in each case at least partially to light from the original subject, in the case of the green separation record effecting part of the said reversal exposure to light from the original passing a red filter, in the case of the blue separation record effecting part of the said reversal exposure to light from the original passing through a green filter and in the case of the red separation record effecting part of the said reversal exposure to light from the original passing through a red filter, each said reversal exposure being effected with the photographic element behind and in register with a record of the highlights only of the original subject.

16. Process for the production of a set of three screen positive records, recording the blue, green and red sensations of an original multicolored subject and suitable for the preparation of litho plates for reproduction of the original respectively in yellow, magenta and cyan inks of which the cyan ink has an undesirably high absorption for green light, which comprises producing the separate screen positive records each by exposing a photographic element having an emulsion with high contact behind a half-tone screen to light from the original subject, via blue, green and red filters respectively, the photographic element in each case being sensitive to the light transmitted by said filter, developing each screen latent image thus obtained with an aromatic primary amino developing agent in the presence of a color coupler which combines with the oxidation products of such developer to produce a dye image, thereby producing a negative image made up of areas of developed silver with a dye image in situ therewith, said development being such as to produce a dye image with a gamma value of at least approximately 2.5, bleaching the said silver image, applying an antihalation backing to the photographic element, exposing the unexposed areas of the said photographic element to light incident on the same side thereof as the original exposure, the said light being of a color to which the photographic emulsion is sensitive and being of such intensity that the light is substantially completely absorbed by the said dye image, redeveloping the photographic element to a gamma value of at least approximately 4.0 in a developer which will not redevelop any rehalogenized silver negative image which may be present, fixing the photographic element to remove any residual silver halide and removing the dye image and the antihalation backing, the said reversal exposure being effected in each case at least partially to light from the original subject and in the case of the green separation record effecting part of the said reversal exposure to light from the original passing through a red filter.

References Cited in the file of this patent

UNITED STATES PATENTS 2,165,407 Murray ---------------- July 11, 1939
2,182,814 Marasco -------------- Dec. 12, 1939
2,327,822 Russell ---------------- Aug. 24, 1943

FOREIGN PATENTS 593,839 Germany -------------- Mar. 6, 1934

OTHER REFERENCES

Cackett, "Penrose Annual," 1950, vol. 44, pp. 112–113.
Process Engravers' Monthly, Feb. 1947, page 50; Aug. 1948, pages 236, 237; Sept. 1948, pages 287–288.